(12) United States Patent
Miyachi

(10) Patent No.: US 8,753,409 B2
(45) Date of Patent: Jun. 17, 2014

(54) SOLID ELECTROLYTIC CAPACITOR AND METHOD OF MANUFACTURING THE SAME

(71) Applicant: Sanyo Electric Co., Ltd., Moriguchi (JP)

(72) Inventor: Yuji Miyachi, Daito (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 14/151,282

(22) Filed: Jan. 9, 2014

(65) Prior Publication Data

US 2014/0123452 A1    May 8, 2014

Related U.S. Application Data

(62) Division of application No. 13/153,722, filed on Jun. 6, 2011, now abandoned.

(30) Foreign Application Priority Data

Jun. 17, 2010   (JP) ................................ 2010-138009

(51) Int. Cl.
*H01G 9/00*   (2006.01)

(52) U.S. Cl.
USPC ........................................................ 29/25.03

(58) Field of Classification Search
None
See application file for complete search history.

(56) References Cited

U.S. PATENT DOCUMENTS

| | | |
|---|---|---|
| 6,229,688 B1 | 5/2001 | Kobayashi et al. |
| 6,423,104 B1 | 7/2002 | Omori et al. |
| 6,594,141 B2 | 7/2003 | Takada |
| 6,613,190 B2 | 9/2003 | Omori et al. |
| 6,751,833 B2 | 6/2004 | Saito et al. |
| 7,342,772 B2 | 3/2008 | Tadanobu et al. |
| 2002/0001169 A1 | 1/2002 | Shiraishi et al. |
| 2008/0106855 A1 | 5/2008 | Utashiro |
| 2010/0271758 A1 | 10/2010 | Furuzawa et al. |

FOREIGN PATENT DOCUMENTS

| | | |
|---|---|---|
| JP | 2-106024 A | 4/1990 |
| JP | 03-073510 A | 3/1991 |
| JP | 2004-281714 A | 10/2004 |
| JP | 2004-342666 A | 12/2004 |
| JP | 2007-081069 A | 3/2007 |
| JP | 2007227845 A | 9/2007 |
| JP | 2010-080600 A | 4/2010 |

*Primary Examiner* — Seahvosh Nikmanesh
(74) *Attorney, Agent, or Firm* — Westerman, Hattori, Daniels & Adrian, LLP

(57) ABSTRACT

A method of manufacturing a solid electrolytic capacitor includes steps (a) and (b). In the step (a), an element body is placed on a surface of a first terminal component part after applying a first conductive adhesive to the surface of the first terminal component part. The element body is placed with a third side surface of the element body facing the surface of the first terminal component part such that the first conductive adhesive is interposed between the third side surface of the element body and the first terminal component part. The step (b) is performed after the step (a). In the step (b), a second conductive adhesive is applied to fill space between a second terminal component part and a second side surface of the element body such that an opening is not filled with the second conductive adhesive.

4 Claims, 8 Drawing Sheets

SOLID ELECTROLYTIC CAPACITOR AND METHOD OF MANUFACTURING THE SAME

CROSS-REFERENCE TO RELATED APPLICATIONS

The present application is a Divisional of U.S. patent application Ser. No. 13/153,722 filed Jun. 6, 2011, which is based on and claims priority of Japanese Patent Application No. 2010-138009, filed Jun. 17, 2010, the entirety of which is incorporated herein by reference.

BACKGROUND OF THE INVENTION

1. Field of the Invention

The invention relates to a solid electrolytic capacitor and a method of manufacturing the solid electrolytic capacitor.

2. Description of Related Art

A solid electrolytic capacitor includes a capacitor element, an anode terminal, and a cathode terminal. The capacitor element has an element body with an outer circumference the region of which is at least partially defined by a cathode layer, and an anode lead pulled out of the element body through the outer circumference of the element body. The anode terminal is electrically connected to an anode lead. The cathode terminal is electrically connected to a cathode layer.

The solid electrolytic capacitor may have the structure as follows. The element body is in the form of a rectangular parallelepiped. The outer circumference of the element body is defined by a first side surface through which the anode lead is pulled out, a second side surface opposite the first side surface, and third and fourth side surfaces opposite each other and which extend between peripheral edges of the first side surface and peripheral edges of the second side surface. The cathode terminal has first and second terminal component parts. The first terminal component part extends along the third side surface of the element body. The second terminal component part adjoins the first terminal component part, and extends above the second side surface of the element body.

In the aforementioned conventional structure of the solid electrolytic capacitor, the cathode layer forms at least the third side surface of the outer circumference of the element body, and a conductive adhesive is interposed between the third side surface and the first terminal component part. This forms satisfactory electrical connection between the cathode terminal and the cathode layer, allowing the conventional solid electrolytic capacitor to achieve ESR (equivalent series resistance) required at the time of development of the solid electrolytic capacitor.

Meanwhile, the solid electrolytic capacitor has been required to achieve lower ESR in response to a recent trend toward higher performance of an electronic device in which the solid electrolytic capacitor is to be incorporated.

SUMMARY OF THE INVENTION

A solid electrolytic capacitor of the invention includes a capacitor element, an anode terminal, and a cathode terminal. The capacitor element has an element body with an outer circumference the region of which is at least partially defined by a cathode layer, and an anode lead pulled out of the element body through the outer circumference of the element body. The outer circumference of the element body is defined by a first side surface through which the anode lead is pulled out, a second side surface opposite the first side surface, and third and fourth side surfaces opposite each other and which extend between peripheral edges of the first side surface and peripheral edges of the second side surface. An exposed surface of the cathode layer is defined at least on the second and third side surfaces of the outer circumference of the element body. The anode terminal is electrically connected to the anode lead. The cathode terminal is electrically connected to the cathode layer. The cathode terminal has first and second terminal component parts. The first terminal component part extends along the third side surface of the element body. The second terminal component part adjoins the first terminal component part while extending above the second side surface of the element body. A first conductive adhesive is interposed between the first terminal component part and the third side surface of the element body. A second conductive adhesive is interposed between the second terminal component part and the second side surface of the element body. The second conductive adhesive extends along the second side surface of the element body to reach the peripheral edge of the fourth side surface.

A manufacturing method of the invention is a method of manufacturing a solid electrolytic capacitor. The solid electrolytic capacitor includes a capacitor element, an anode terminal, and a cathode terminal. The capacitor element has an element body with an outer circumference the region of which is at least partially defined by a cathode layer, and an anode lead pulled out of the element body through the outer circumference of the element body. The outer circumference of the element body is defined by a first side surface through which the anode lead is pulled out, a second side surface opposite the first side surface, and third and fourth side surfaces opposite each other and which extend between peripheral edges of the first side surface and peripheral edges of the second side surface. An exposed surface of the cathode layer is defined at least on the second and third side surfaces of the outer circumference of the element body. The anode terminal is electrically connected to the anode lead. The cathode terminal is electrically connected to the cathode layer. The cathode terminal has first and second terminal component parts. The first terminal component part extends along the third side surface of the element body. The second terminal component part adjoins the first terminal component part while extending above the second side surface of the element body. The manufacturing method includes steps (a) and (b). In the step (a), the element body is placed on a surface of the first terminal component part after applying the first conductive adhesive to the surface of the first terminal component part. The element body is placed with the third side surface of the element body facing the surface of the first terminal component part such that the first conductive adhesive is interposed between the third side surface of the element body and the first terminal component part. The step (b) is performed after the step (a). In the step (b), a second conductive adhesive is applied to fill space between the second terminal component part and the second side surface of the element body.

DETAILED DESCRIPTION OF THE EMBODIMENTS

Figure 1:
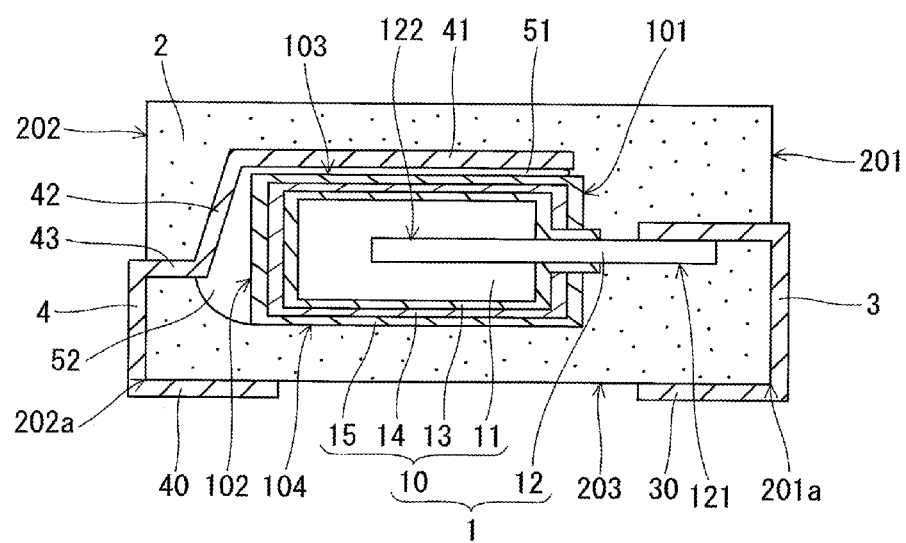
FIG. 1 is a sectional view of a solid electrolytic capacitor of an embodiment of the invention.

FIG. 1 is a perspective view of a solid electrolytic capacitor of an embodiment of the invention. As shown in FIG. 1, the solid electrolytic capacitor includes a solid electrolytic capacitor element 1, an outer package member 2 covering the capacitor element 1, an anode terminal 3, and a cathode terminal 4. In the embodiment, the outer package member 2 is made of resin such as an epoxy resin.

The capacitor element 1 has an element body 10 in the form of a rectangular parallelepiped, and an anode lead 12 pulled out of the element body 10 through its outer circumference. The outer circumference is defined by a first side surface 101 through which the anode lead 12 is pulled out, a second side surface 102 opposite the first side surface 101, and third and fourth side surfaces 103 and 104 opposite each other and which extend between peripheral edges of the first side surface 101 and peripheral edges of the second side surface 102.

The element body 10 includes an anode body 11 in the form of a rectangular parallelepiped in which the anode lead 12 is implanted, a dielectric layer 13 formed on a surface of the anode body 11, an electrolyte layer 14 formed on the dielectric layer 13, and a cathode layer 15 formed on the electrolyte layer 14. The anode lead 12 is in the form of a column.

The anode body 11 is constructed of a porous sintered body made of a valve acting metal. Examples of the valve acting metal include tantalum, niobium, titanium, and aluminum. The anode lead 12 has a base end portion 122 buried in the anode body 11, and a tip end portion 121 pulled out of the anode body 11 through its surface. The anode lead 12 is made of a valve acting metal the type of which is the same as or different from the valve acting metal constituting the anode body 11. The anode body 11 and the anode lead 12 are electrically connected to each other.

The dielectric layer 13 is constructed of an oxide film formed on the surface of the anode body 11. The oxide film is formed by dipping the anode body 11 into an electrolytic solution such as a phosphorus solution and an adipic acid solution, and by electrochemically oxidizing the surface of the anode body 11 (anodic oxidation).

The electrolyte layer 14 is made of an electrolyte material that can be solidified on the dielectric layer 13. the electrolyte material may be a conductive inorganic material such as manganese dioxide, or a conductive organic material such as TCNQ (tetracyano-quinodimethane) complex salt and conductive polymer. The cathode layer 15 is constructed of a carbon layer (not shown) formed on the electrolyte layer 14, and a silver paint layer (not shown) formed on the carbon layer. The electrolyte layer 14 and the cathode layer 15 are electrically connected to each other. The cathode layer 15 forms at least the second and third side surfaces 102 and 103 of the outer circumference of the element body 10. So, an exposed surface of the cathode layer 15 is defined on the second and third side surfaces 102 and 103. In the embodiment, the cathode layer 15 also forms the fourth side surface 104.

In the capacitor element 1, part of the anode lead 12 pulled out of the anode body 11 and the cathode layer 15 form anode and cathode parts of the capacitor element 1 respectively, and the dielectric layer 13 and the electrolyte layer 14 are placed between the anode and cathode parts.

The anode terminal 3 is electrically connected to the anode lead 12, and part of the anode terminal 3 is exposed to the outer circumference of the outer package member 2. The cathode terminal 4 is electrically connected to the cathode layer 15, and part of the cathode terminal 4 is exposed to the outer circumference of the outer package member 2.

More specifically, the anode lead 12 and the anode terminal 3 are electrically connected to each other by welding. The anode terminal 3 is pulled out to a first side surface 201 forming the outer circumference of the outer package member 2, and which is defined forward of the tip end of the anode lead 12. The anode terminal 3 extends downward along the first side surface 201, and then bends at a lower edge 201a of the first side surface 201, thereby defining a tip end portion 30 of the anode terminal 3 along a lower surface 203 of the outer package member 2.

The cathode terminal 4 has first and second terminal component parts 41 and 42. The first terminal component part 41 extends along the third side surface 103 of the element body 10. The second terminal component part 42 adjoins the first terminal component part 41, and extends above the second side surface 102 of the element body 10. In the embodiment, the second terminal component part 42 extends diagonally downward left from the left edge of the first terminal component part 41 as shown in FIG. 1. The cathode terminal 4 further has a third terminal component part 43 that adjoins the lower edge of the second terminal component part 42. The third terminal component part 43 extends in a direction substantially parallel to the lower surface 203 of the outer package member 2 to reach a second side surface 202 of the outer package member 2 opposite the first side surface 201.

A first conductive adhesive 51 is interposed between the first terminal component part 41 and the third side surface 103 of the element body 10. A second conductive adhesive 52 is interposed between the second terminal component part 42 and the second side surface 102 of the element body 10. The second conductive adhesive 52 extends along the second side surface 102 to reach the lower edge of the second side surface 102 (in FIG. 1, the left edge of the fourth side surface 104). As a result, electrical connection is made between the cathode layer 15 and the cathode terminal 4. The type of the second conductive adhesive 52 may be the same as or different from that of the first conductive adhesive 51.

The cathode terminal 4 is pulled out to the second side surface 202 of the outer package member 2. The cathode terminal 4 extends downward along the second side surface 202, and then bends at a lower edge 202a of the second side surface 202, thereby defining a tip end portion 40 of the cathode terminal 4 along the lower surface 203 of the outer package member 2.

A method of manufacturing the solid electrolytic capacitor of the embodiment is described in detail next by referring to drawings. The manufacturing method includes an element placing step, a filling step, an outer package forming step, a cutting step, and a terminal forming step performed in this order.

Figure 2:
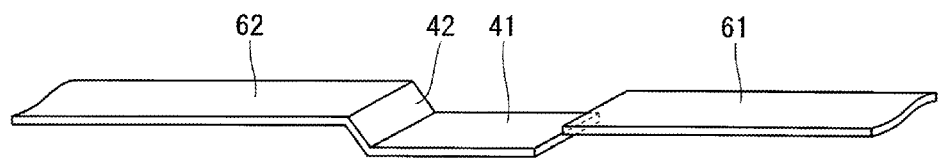
FIG. 2 is a perspective view of an anode frame and a cathode frame to become an anode terminal and a cathode terminal respectively of the solid electrolytic capacitor.

First, an anode frame 61 to become the anode terminal 3 and a cathode frame 62 to become the cathode terminal 4 are prepared as shown in FIG. 2 before the element placing step starts. The cathode frame 62 is bent to define the first and second terminal component parts 41 and 42.

Figure 3:
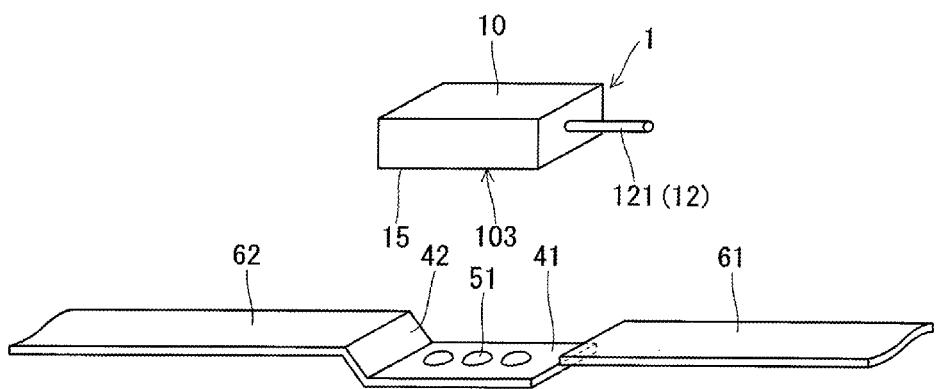
FIG. 3 is a perspective view showing an element placing step of a method of manufacturing the solid electrolytic capacitor.
Figure 4:
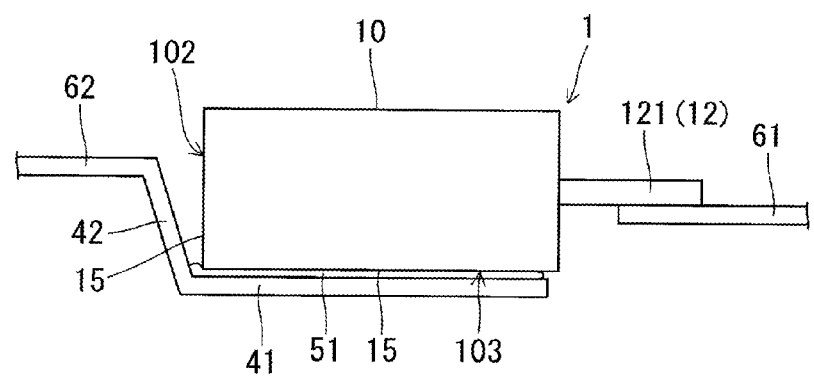
FIG. 4 is a side view showing a capacitor element and a conductive adhesive in a state after the element placing step is performed.

FIG. 3 is a perspective view showing the element placing step. In the element placing step, the first conductive adhesive 51 is applied to a surface of the first terminal component part 41, and thereafter the capacitor element 1 is placed on the anode and cathode frames 61 and 62 as shown in FIG. 3. More specifically, the element body 10 is placed on the surface of the first terminal component part 41 with the third side surface 103 facing the surface of the first terminal component part 41. As a result, the first conductive adhesive 51 extends over the surface of the first terminal component part 41 as shown in FIG. 4, so that the first conductive adhesive 51 is extensively interposed between the third side surface 103 and the first terminal component part 41. This forms satisfactory electrical connection between the first terminal component part 41 and the cathode layer 15.

In the element placing step, the tip end portion 121 of the anode lead 12 is made to contact the anode frame 61, and contact surfaces of the anode lead 12 and the anode frame 61 are subjected to welding, thereby forming satisfactory electrical connection between the anode lead 12 and the anode frame 61.

Figure 5:
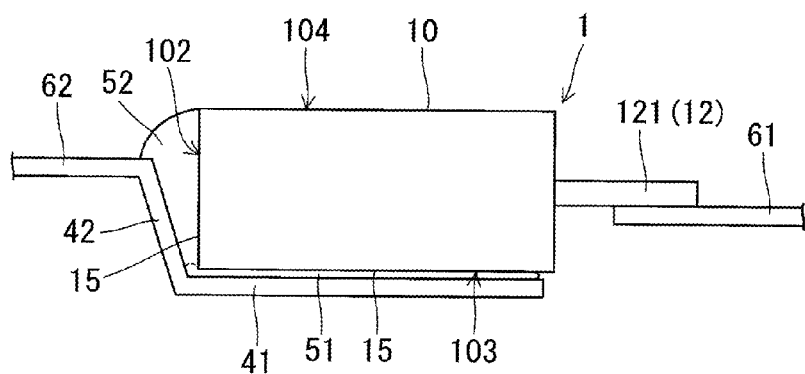
FIG. 5 is a side view showing a filling step of the manufacturing method.

FIG. 5 is a side view showing the filling step. In the filling step, the second conductive adhesive 52 is applied to fill space between the second terminal component part 42 and the second side surface 102 of the element body 10 as shown in FIG. 5. To be specific, the second conductive adhesive 52 is applied such that it extends along the second side surface 102 to reach the left edge of the fourth side surface 104 as shown in FIG. 5. Thus, the second conductive adhesive 52 is interposed between the second side surface 102 and the second terminal component part 42, while the second conductive adhesive 52 extensively contacts the second side surface 102. This forms satisfactory electrical connection between the second terminal component part 42 and the cathode layer 15. The type of the second conductive adhesive 52 may be the same as or different from that of the first conductive adhesive 51.

Figure 6:
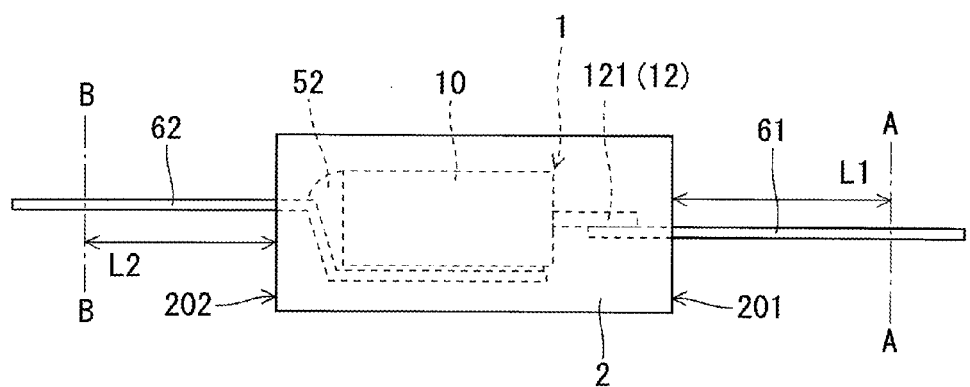
FIG. 6 is a side view showing an outer package forming step of the manufacturing method.

FIG. 6 is a side view showing the outer package forming step. In the outer package forming step, the capacitor element 1 is covered by resin such as an epoxy resin by using a molding technique as shown in FIG. 6. As a result, the outer package member 2 is formed, and the capacitor element 1 is covered by the outer package member 2.

Figure 7:
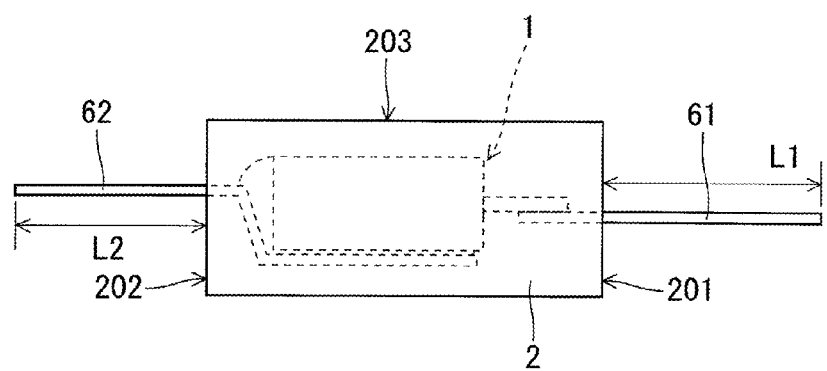
FIG. 7 is a side view showing a cutting step of the manufacturing method.

FIG. 7 is a side view showing the cutting step. In the cutting step, as shown in FIG. 7, the anode frame 61 is cut along a line A-A shown in FIG. 6 such that a length L1 of the anode frame 61 from the first side surface 201 of the outer package member 2 becomes a given length. Further, the cathode frame 62 is cut along a line B-B shown in FIG. 6 such that a length L2 of the cathode frame 62 from the second side surface 202 of the outer package member 2 becomes a given length.

Figure 8:
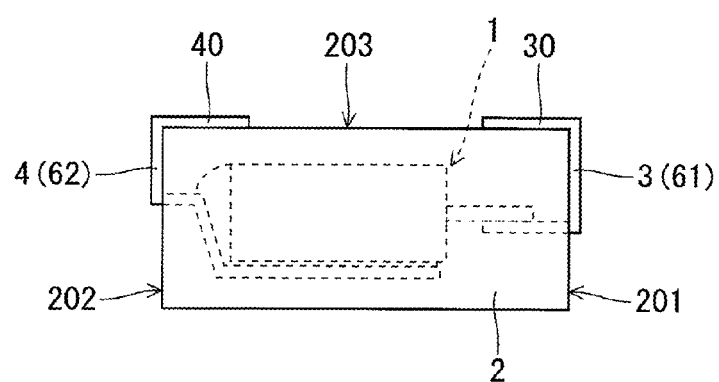
FIG. 8 is a side view showing a terminal forming step of the manufacturing method.

FIG. 8 is a side view showing the terminal forming step. In the terminal forming step, as shown in FIG. 8, part of the anode frame 61 pulled out to the first side surface 201 is bent, and the bent part is made to extend along the first side surface 201 and along a surface of the outer package member 2 to become the lower surface 203 (see FIG. 1). Then, the anode frame 61 becomes the anode terminal 3, and the tip end portion 30 of the anode terminal 3 is defined along the surface of the outer package member 2 to become the lower surface 203.

In the terminal forming step, part of the cathode frame 62 pulled out to the second side surface 202 is also bent, and the bent part is made to extend along the second side surface 202 and the surface to become the lower surface 203. Then, the cathode frame 62 becomes the cathode terminal 4, and the tip end portion 40 of the cathode terminal 4 is defined along the surface to become the lower surface 203.

In the solid electrolytic capacitor, the cathode layer 15 forms the second and third side surfaces 102 and 103 of the element body 10. Further, the conductive adhesives 51 and 52 contact not only the third side surface 103, but they also extensively contact the second side surface 102. This makes area in which the cathode terminal 4 and the cathode layer 15 are electrically connected greater than that of a conventional solid electrolytic capacitor in which a conductive adhesive is interposed only between the first terminal component part 41 and the third side surface 103, allowing the solid electrolytic capacitor of the embodiment to achieve lower ESR.

Figure 9:
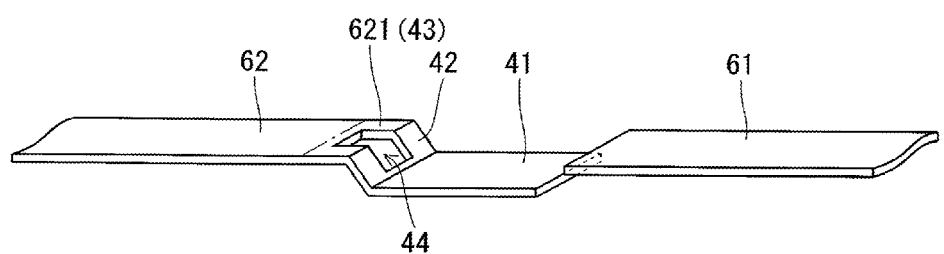
FIG. 9 is a perspective view of an anode frame and a cathode frame to become an anode terminal and a cathode terminal respectively of a first modification of the solid electrolytic capacitor.

FIG. 9 is a perspective view of a first modification of the solid electrolytic capacitor, and which shows the anode frame 61 and the cathode frame 62 to become the anode terminal 3 and the cathode terminal 4 respectively of the solid electrolytic capacitor of the first embodiment. As shown in FIG. 9, the second terminal component part 42 of the cathode frame 62 may be provided with an opening 44 that passes through the second terminal component part 42 from its front surface to its rear surface. In the first modification, the opening 44 may be defined not only the second terminal component part 42 but also in a region 621 of the cathode frame 62 to become the third terminal component part 43 of the cathode terminal 4.

Figure 10:
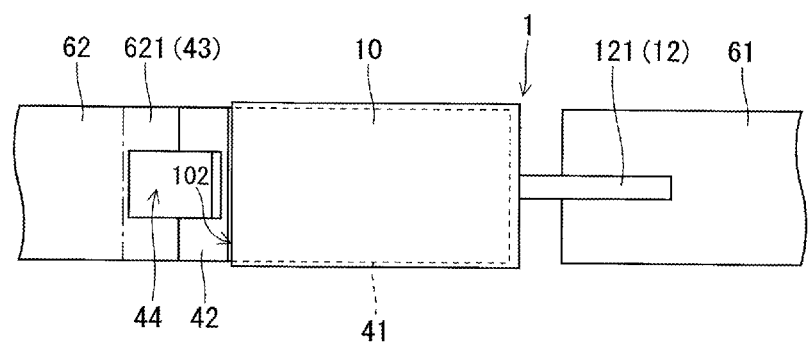
FIG. 10 is a top view showing an element placing step of a method of manufacturing the solid electrolytic capacitor of the first modification.
Figure 11:
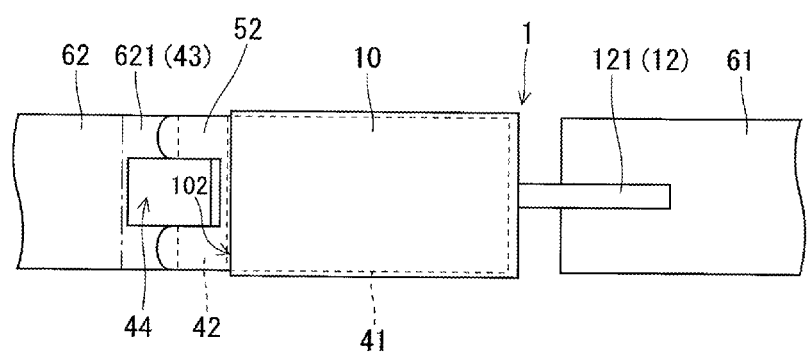
FIG. 11 is a top view showing a filling step of the method of manufacturing the solid electrolytic capacitor of the first modification.

In order to form the solid electrolytic capacitor of the first modification, as shown in FIG. 10 (and by referring to FIG. 4), the capacitor element 1 is placed on the anode and cathode frames 61 and 62 in the element placing step. Next, in the filling step, the second conductive adhesive 52 is applied to fill space between the second terminal component part 42 and the second side surface 102 of the element body 10 such that the opening 44 is not filled with the second conductive adhesive 52 as shown in FIG. 11. So, in the solid electrolytic capacitor as formed, the second conductive adhesive 52 is interposed between the second terminal component part 42 and the second side surface 102, and the opening 44 remains exposed without being filled with the second conductive adhesive 52.

In the solid electrolytic capacitor of the first modification, resin defined on the front surface of the second terminal component part 42 and resin defined on the rear surface of the second terminal component part 42 that are part of the outer package member 2 are connected to each other through the opening 44 defined in the second terminal component part 42. This enhances the strength of the outer package member 2 at a place near the second terminal component part 42, so that a defect such as a crack is unlikely to occur in the outer package member 2 even if stress is generated in the outer package member 2 as a result of bending of the cathode terminal 4 in the terminal forming step (see FIG. 8).

Figure 12:
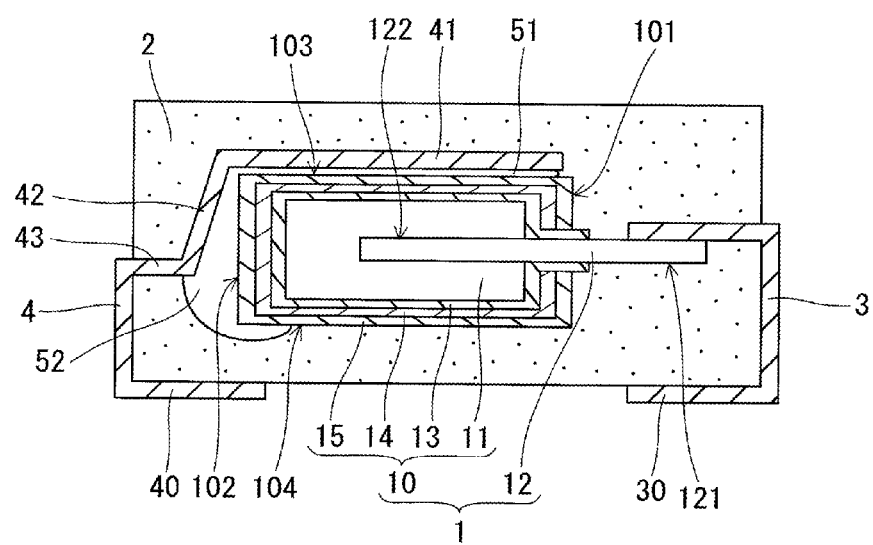
FIG. 12 is a sectional view of a second modification of the solid electrolytic capacitor.

FIG. 12 is a sectional view of a second modification of the solid electrolytic capacitor. As shown in FIG. 12. in the solid electrolytic capacitor of the second modification, the cathode layer 15 may form the fourth side surface 104 as well as the second and third side surfaces 102 and 103 of the element body 10, and part of the second conductive adhesive 52 may extend further to cover the fourth side surface 104 of the element body 10. This further increases a contact area between the cathode terminal 4 and the cathode layer 15 of the capacitor element 1, resulting in further reduction of ESR.

The structure of each part of the invention is not limited to that shown in the embodiment described above. Various modifications can be devised without departing from the technical scope recited in claims. By way of example, in the solid electrolytic capacitor shown in FIG. 1, the second terminal component part 42 may extend in a direction substantially vertical to the first terminal component part 41. Namely, the second terminal component part 42 may extend in a direction substantially parallel to the second side surface 102 of the element body 10.

The structures of the capacitor element 1, the outer package member 2, the anode terminal 3, the cathode terminal 4, and the conductive adhesives 51 and 52 are not limited to those shown in the embodiment described above. Various modifications thereof can be devised without departing from the technical scope recited in claims.

The invention claimed is:

1. A method of manufacturing a solid electrolytic capacitor, the solid electrolytic capacitor comprising: a capacitor element having an element body with an outer circumference the region of which is at least partially defined by a cathode layer, and an anode lead pulled out of the element body through the outer circumference of the element body; an anode terminal electrically connected to the anode lead; and a cathode terminal electrically connected to the cathode layer, the outer circumference of the element body being defined by a first side surface through which the anode lead is pulled out, a second side surface opposite the first side surface, and third and fourth side surfaces opposite each other and which extend between peripheral edges of the first side surface and peripheral edges of the second side surface, an exposed surface of the cathode layer being defined at least on the second and third side surfaces of the outer circumference of the element body, the cathode terminal having a first terminal component part extending along the third side surface of the element body, a second terminal component part adjoining the first terminal component part while obliquely extending such that a distance from the second side surface increases gradually, and a third terminal component part adjoining the second terminal component part while extending toward a direction opposite a direction in which the anode lead is pulled out of the element body through the first side surface, the second terminal component part being provided with an opening that passes through the second terminal component part from its front surface to its rear surface, the opening extending to reach the third terminal component part, the method comprising the steps of:
    (a) placing the element body on a surface of the first terminal component part after applying a first conductive adhesive to the surface of the first terminal component part, the element body being placed with the third side surface of the element body facing the surface of the first terminal component part such that the first conductive adhesive is interposed between the third side surface of the element body and the first terminal component part; and
    (b) applying a second conductive adhesive to fill space between the second terminal component part and the second side surface of the element body such that the opening is not filled with the second conductive adhesive, after the step (a).

2. The method according to claim 1, wherein application of the second conductive adhesive in the step (b) is such that the second conductive adhesive extends along the second side surface of the element body to reach the peripheral edge of the fourth side surface of the element body.

3. The method according to claim 1, wherein application of the second conductive adhesive in the step (b) is such that the second conductive adhesive extends to reach a surface of the third terminal component part.

4. The method according to claim 1, wherein in the step (a), the first conductive adhesive is applied to multiple places of the surface of the first terminal component part, and then the element body is placed with the third side surface of the element body facing the surface of the first terminal component part.

* * * * *